Patented Oct. 25, 1938

2,134,139

UNITED STATES PATENT OFFICE 2,134,139

PRESERVATION OF RUBBER

George D. Martin, Nitro, W. Va., assignor, by mesne assignments, to Monsanto Chemical Company, Wilmington, Del., a corporation of Delaware No Drawing. Application June 15, 1935, Serial No. 26,870

18 Claims. (Cl. 18—50)

The present invention relates to the art of rubber manufacture, and particularly relates to the preparation of rubber compositions which resist deterioration due to aging or to exposure to the atmosphere. It has long been known that such deterioration can be greatly retarded by treating the rubber either before or after vulcanization with certain substances known as age-resistors or antioxidants. One object of this invention is to provide a new and superior class of antioxidants for rubber. A further object of this invention is to provide a new and superior class of materials which when incorporated into rubber, preferably before the vulcanization thereof, imparts thereto properties markedly resistant to tear and cracking when portions thereof have been repeatedly and alternately stretched and the tension removed. Such a process is analogous to the flexing of an automobile tire in actual road service.

The age resisting characteristics of a vulcanized rubber product can be readily ascertained by subjecting samples of the vulcanized product in a bomb to the action of oxygen under elevated pressure and at an elevated temperature. The aged rubber samples are then examined and tested and the test data compared with the results obtained on testing the unaged rubber samples. The deterioration in properties effected as a result of the oxidation treatment is indicative of the result that would normally be expected of that particular stock during actual service. Such a test is known as the Bierer-Davis aging test and produces an effect on a vulcanized rubber stock comparable with that resulting from several years of natural ageing of the rubber depending upon the condition of the test. In all the oxygen bomb tests hereinafter set forth, the aging was carried out at temperatures of 70° C. and an oxygen pressure of 300 pounds per square inch.

The flex cracking resistance of the vulcanized rubber products was determined on a flexing machine as set forth by L. V. Cooper, Analytical Edition of Industrial & Engineering Chemistry, vol. 2, No. 4, 1930, pages 391–394.

According to the present invention, a new class of anti-oxidants or age-resisters has been found which, upon incorporating into a rubber stock, imparts exceptional age resisting and flex cracking resistance to the vulcanized rubber product. The compounds herein disclosed as imparting such desirable properties to vulcanized rubber comprise the products obtainable by reacting a diaryl phenylene diamine with an aldehyde and an alcohol.

For example, the following are typical members of the new and preferred class of materials which has been prepared and tested in the manner hereinbefore set forth: Reaction product of diphenyl-p-phenylene diamine, formaldehyde and butyl alcohol; reaction product of diphenyl-p-phenylene diamine, formaldehyde and glycerine; reaction product of diphenyl-p-phenylene diamine, formaldehyde and methyl alcohol; reaction product of diphenyl-p-phenylene diamine, formaldehyde and amyl alcohol; reaction product of diphenyl-p-phenylene diamine, formaldehyde and cyclohexanol; reaction product of diphenyl-p-phenylene diamine, formaldehyde and lauryl alcohol; reaction product of diphenyl-p-phenylene diamine, formaldehyde and benzyl alcohol; reaction product of diphenyl-meta-phenylene diamine, formaldehyde and butyl alcohol; reaction product of diphenyl-o-phenylene diamine, formaldehyde and lauryl alcohol; reaction product of dibeta naphthyl-p-phenylene diamine, formaldehyde and butyl alcohol; reaction product of di ortho tolyl-p-phenylene diamine, formaldehyde and butyl alcohol; reaction product of diphenyl-p-phenylene diamine, butyl aldehyde and butyl alcohol.

In place of the alcohols hereinbefore set forth I may employ heptyl alcohol, octyl alcohol, cetyl alcohol and analogous alcohols. In place of the amines hereinbefore set forth I may use di alpha naphthyl-p-phenylene diamine, di biphenyl-p-phenylene diamine and analogues and chemical equivalents thereof. Again the use of other aldehydes as for example acetaldehyde, propionaldehyde and the like may be employed in the preparation of the new and preferred class of compounds.

The compounds falling within the scope of the present invention may be prepared by reacting equi-molecular proportions of amine, formaldehyde and alcohol or by reacting one molecular proportion of amine with substantially two molecular proportions each of formaldehyde and alcohol. Any one or a mixture of the above enumerated substances or of these substances with other anti-oxidants may be incorporated into rubber with good effect on its properties. The compounds of the present invention are believed to possess the following structural formula:

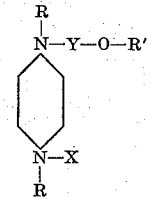

wherein R is an aromatic radical, R' is alkyl, aralkyl or aryl, Y is a methylene or alkylidene radical, and X is hydrogen or a Y O R' group, although the invention is not limited as to any possible structure of the new compounds.

The following are to be understood as illustrative only and not in any sense limitative of the scope of the present invention.

Example I 260 parts by weight of diphenyl-p-phenylene diamine (substantially one molecular proportion), 200 parts by weight of 40% formaldehyde solution (substantially a 33% excess over two molecular proportions) and 200 parts by weight of n-butyl alcohol (substantially a 33% excess over two molecular proportions) were reacted in the presence of a suitable solvent, as for example benzene, and a suitable condensing agent, as for example sodium carbonate, by refluxing said reactants. After refluxing for substantially 2 to 4 hours, the oily top layer was separated off, washed with water, and the benzene distilled therefrom, whereupon a high yield of a brown viscous oil was obtained. It is thought the following reaction takes place as indicated by McLeod and Robinson, Journal of the Chemical Society, vol. 119 (1921) page 1471.

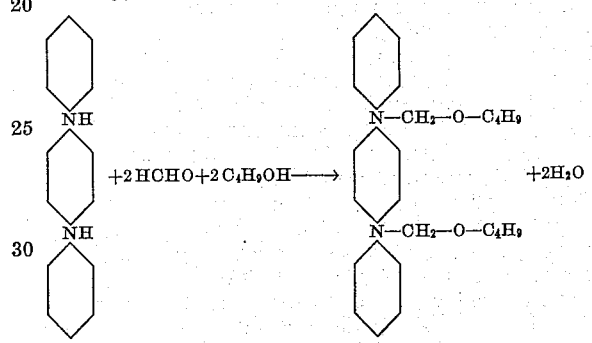

The product prepared as described was incorporated in a typical rubber tread stock comprising:

|  | Parts |
| --- | --- |
| Smoked sheet rubber | 100 |
| Carbon black | 50 |
| Zinc oxide | 5 |
| Sulfur | 3 |
| Stearic acid | 3 |
| Pine tar | 2 |
| Benzothiazyl ester of thiobenzoic acid | 0.8 |
| Diphenyl guanidine | 0.2 |
| The reaction product of substantially one molecular proportion of diphenyl-p-phenylene diamine and substantially two molecular proportions each of formaldehyde and n-butyl alcohol | 1.0 |

The rubber stock so compounded was vulcanized in the well known manner and portions of the vulcanized product were then artificially aged by heating in the Bierer-Davis oxygen bomb for 96 hours at a temperature of 70° C. and an oxygen pressure of 300 pounds of oxygen per square inch. A comparison between the aged and unaged rubber product is given in Table I.

Table I

| Cure | | | Modulus of elasticity in lbs/in.² at elongations of— | | Tensile at break in lbs/in.² | Ult. elong., percent |
| --- | --- | --- | --- | --- | --- | --- |
| Mins. | Lbs. steam pressure | Hrs. aged | 300% | 500% | | |
| 75 | 30 | 0 | 2055 | 3980 | 4145 | 535 |
| 75 | 30 | 96 | 2165 | -------- | 2830 | 410 |
| 90 | 30 | 0 | 2130 | 4150 | 4150 | 500 |
| 90 | 30 | 96 | 2180 | -------- | 2610 | 365 |
| 105 | 30 | 0 | 2210 | 4060 | 4060 | 500 |
| 105 | 30 | 96 | 2320 | -------- | 2540 | 345 |

From the data set forth in Table I it is readily shown that the new and preferred class of materials possess exceptionally strong antioxidant action when employed in a typical rubber tread stock. An important improvement of the new class of antioxidants, for example the reaction product of diphenyl-p-phenylene diamine, formaldehyde and n-butyl alcohol described above over a diaryl-phenylene diamine, for example diphenyl-p-phenylene diamine, is that of decreased blooming to the surface of the vulcanized rubber product. This fact is of great value to the rubber trade. Another important advantage in the use of the preferred class of materials, for example the reaction product of diphenyl-p-phenylene diamine, formaldehyde and butyl alcohol over the use of a diaryl-phenylene diamine, for example diphenyl-p-phenylene diamine, in particular when employed in a so-called gum stock, lies in the fact that the initial cures are retarded, whereas at the optimum cures activation is effected. Furthermore, from a "scorch" standpoint the new and preferred class of materials show a greater ease of handling and greater resistance to "scorch" than do stocks employing a diaryl phenylene diamine, for example diphenyl-p-phenylene diamine. Furthermore, on flexing the cured rubber product in the manner above described, it was found to be markedly superior in flex cracking resistance to a similar stock containing no antioxidant.

A stock was compounded comprising:

|  | Parts |
| --- | --- |
| Smoked sheet rubber | 100 |
| "P33" carbon black | 40 |
| Zinc oxide | 5 |
| Sulfur | 0.8 |
| Benzothiazyl ester of thiobenzoic acid | 2.0 |
| Diphenyl guanidine phthalate | 0.8 |
| Stearic acid | 1.0 |
| The reaction product of diphenyl-p-phenylene diamine, formaldehyde and butyl alcohol described above | 1.5 |

The stock so compounded was vulcanized and portions of the cured rubber product were elongated 50% and heated at 121° C. under an air pressure of 100 pounds per square inch. A comparison between the unaged and aged vulcanized rubber products follows in Table II.

Table II

| Cure | | | Modulus of elasticity in lbs/in.² at elongations of— | | Tensile at break in lbs/in.² | Ult. elong., percent |
| --- | --- | --- | --- | --- | --- | --- |
| Mins. | Lbs. steam pressure | Hrs. aged | 500% | 700% | | |
| 6 | 50 | 0 | 1120 | 2750 | 3150 | 730 |
| 6 | 50 | 8 | 1160 | -------- | 2480 | 675 |
| 9 | 50 | 0 | 1170 | 2905 | 3485 | 770 |
| 9 | 50 | 8 | 1060 | -------- | 2150 | 665 |
| 12 | 50 | 0 | 1105 | 2830 | 3415 | 760 |
| 12 | 50 | 8 | 995 | 2250 | 2250 | 700 |
| 15 | 50 | 0 | 1085 | 2830 | 3240 | 735 |
| 15 | 50 | 8 | 995 | -------- | 1920 | 665 |

It is seen from the above results of the test that rubber stocks containing small proportions of the new and preferred class of antioxidants resist to a marked degree the extremely exaggerated aging conditions of the air bomb tests described above. An identical stock with that described above with the exception that it contains no antioxidant will disintegrate when subjected to the conditions of the test set forth above.

*Example II*

As another example of the use of the preferred class of antioxidants, a reaction product was prepared by reacting substantially equi-molecular proportions of diphenyl-p-phenylene diamine, formaldehyde and methyl alcohol in a manner analogous to that described above in Example I. A wax-like product so obtained, distilling at 235°–238° C. at 3 m. m. pressure, was incorporated in a rubber stock comprising:

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzothiazyl ester of thiobenzoic acid | 0.8 |
| Diphenyl guanidine | 0.2 |
| The antioxidant described above | 1.0 |

The rubber stock was vulcanized and portions of the cured rubber product aged in the Bierer-Davis oxygen bomb in the manner described above. A comparison between the aged and unaged rubber product is given in Table III.

*Table III*

| Cure | | | Modulus of elasticity in lbs/in.² at elongations of— | | Tensile at break in lbs/in.² | Ult. elong., percent |
|---|---|---|---|---|---|---|
| Mins. | Lbs. steam pressure | Hrs. aged | 300% | 500% | | |
| 70 | 30 | 0 | 2205 | 4000 | 4180 | 520 |
| 70 | 30 | 96 | 2320 | ------ | 3000 | 410 |
| 90 | 30 | 0 | 2130 | 4060 | 4085 | 505 |
| 90 | 30 | 96 | 2300 | ------ | 2760 | 360 |
| 105 | 30 | 0 | 2310 | 4200 | 4200 | 500 |
| 105 | 30 | 96 | 2410 | ------ | 2690 | 330 |

Flexing tests on the above unaged stocks and also on the above stocks aged for 3 days in the Geer oven at 70° C. showed them to possess excellent flexing properties.

*Example III*

Substantially one molecular proportion of diphenyl-p-phenylene diamine was reacted with substantially two molecular proportions each of amyl alcohol and 40% formaldehyde solution in a manner analogous to that set forth above for Example I. The dark brittle resin so obtained was incorporated in a tread stock comprising:

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzothiazyl ester of thiobenzoic acid | 0.8 |
| Diphenyl guanidine | 0.2 |
| The antioxidant described above | 1.0 |

The rubber stock so compounded was vulcanized and aged in the Bierer-Davis oxygen bomb. A comparison between the aged and unaged rubber product is given in Table IV.

*Table IV*

| Cure | | | Modulus of elasticity in lbs/in.² at elongations of— | | Tensile at break in lbs/in.² | Ult. elong., percent |
|---|---|---|---|---|---|---|
| Mins. | Lbs. steam pressure | Hrs. aged | 200% | 400% | | |
| 60 | 30 | 0 | 1310 | 3160 | 4070 | 530 |
| 60 | 30 | 96 | 1418 | 2970 | 2865 | 415 |
| 75 | 30 | 0 | 1320 | 3110 | 3890 | 500 |
| 75 | 30 | 96 | 1485 | ------ | 2630 | 355 |
| 90 | 30 | 0 | 1415 | 3435 | 3975 | 480 |
| 90 | 30 | 96 | 1585 | ------ | 2490 | 330 |

Flexing tests on the unaged stocks and on the stocks after aging for 3 days in the Geer oven at 70° C. showed the stocks to flex exceptionally well.

*Example IV*

Substantially one molecular proportion of diphenyl-p-phenylene diamine was reacted with substantially two molecular proportions of 40% formaldehyde solution and substantially two molecular proportions of cyclohexanol in a manner analogous to that employed for Example I described above. The viscous reaction product so obtained was milled into a typical tread stock comprising:

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzothiazyl ester of thiobenzoic acid | 0.8 |
| Diphenyl guanidine | 0.2 |
| The antioxidant described above | 1.0 |

The compounded rubber stock was vulcanized and the cured rubber product aged in the Biere-Davis oxygen bomb. A comparison was made between the modulus and tensile properties of the unaged and aged cured rubber product with the results given in Table V.

*Table V*

| Cure | | | Modulus of elasticity in lbs/in.² at elongations of— | | Tensile at break in lbs/in.² | Ult. elong., percent |
|---|---|---|---|---|---|---|
| Mins. | Lbs. steam pressure | Hrs. aged | 200% | 400% | | |
| 60 | 30 | 0 | 1275 | 3170 | 4020 | 525 |
| 60 | 30 | 96 | 1340 | 2770 | 2820 | 405 |
| 75 | 30 | 0 | 1350 | 3165 | 3830 | 495 |
| 75 | 30 | 96 | 1488 | ------ | 2580 | 365 |
| 90 | 30 | 0 | 1440 | 3300 | 3730 | 460 |
| 90 | 30 | 96 | 1468 | ------ | 2265 | 320 |

The above stocks also showed good flexing properties, both when unaged and after aging for 3 days in the Geer oven at 70° C.

*Example V*

As another example of the preferred new antioxidants substantially equi-molecular proportions of diphenyl-p-phenylene diamine, 40% formaldehyde and lauric alcohol were reacted in a manner analogous to that described above for Example I. The oily reaction product was incorporated in the well known manner in a tread stock comprising:

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzothiazyl ester of thiobenzoic acid | 0.8 |
| Diphenyl guanidine | 0.2 |
| The antioxidant described above | 1.0 |

After vulcanizing the rubber stock was aged in the Bierer-Davis oxygen bomb with the following results:

*Table VI*

| Cure | | | Modulus of elasticity in lbs/in.$^2$ at elongations of— | | Tensile at break in lbs/in.$^2$ | Ult. elong., percent |
|---|---|---|---|---|---|---|
| Mins. | Lbs. steam pressure | Hrs. aged | 200% | 400% | | |
| 60 | 30 | 0 | 1208 | 2990 | 4025 | 530 |
| 60 | 30 | 96 | 1228 | 2465 | 2590 | 420 |
| 75 | 30 | 0 | 1215 | 3095 | 3820 | 500 |
| 75 | 30 | 96 | 1260 | | 2450 | 380 |
| 90 | 30 | 0 | 1345 | 3275 | 3885 | 475 |
| 90 | 30 | 96 | 1323 | | 2205 | 345 |

Flexing tests carried out in the manner described above on the unaged cured rubber stock and on the same stock after aging 3 days in the Geer oven at 70° C. showed the product set forth in Example V to have particularly good flexing properties.

*Example VI*

Substantially equi-molecular proportions of diphenyl-p-phenylene diamine, formaldehyde and benzyl alcohol were reacted in a manner analogous to that employed in Example I. The resinous product so obtained was incorporated in the usual manner in a tread stock comprising:

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzothiazyl ester of thiobenzoic acid | 0.8 |
| Diphenyl guanidine | 0.2 |
| The antioxidant described above | 1.0 |

After vulcanizing the rubber stock was aged in the Bierer-Davis oxygen bomb and the results obtained as given in Table VII.

*Table VII*

| Cure | | | Modulus of elasticity in lbs/in.$^2$ at elongations of— | | Tensile at break in lbs/in.$^2$ | Ult. elong., percent |
|---|---|---|---|---|---|---|
| Mins. | Lbs. steam pressure | Hrs. aged | 200% | 400% | | |
| 60 | 30 | 0 | 1230 | 3085 | 4055 | 530 |
| 60 | 30 | 96 | 1385 | 2760 | 2780 | 405 |
| 75 | 30 | 0 | 1255 | 3140 | 3865 | 505 |
| 75 | 30 | 96 | 1418 | | 2640 | 380 |
| 90 | 30 | 0 | 1360 | 3310 | 3900 | 475 |
| 90 | 30 | 96 | 1438 | | 2350 | 335 |

Flexing tests carried out in the manner described above on the unaged cured rubber product and on the same cured rubber product after aging in the Geer oven for 3 days at 70° C. showed the reaction product employed in Example VI to have excellent flexing properties.

*Example VII*

Substantially one molecular proportion of diphenyl-p-phenylene diamine was reacted with substantially two molecular proportions each of butyl aldehyde and butyl alcohol in a manner analogous to that employed in Example I, with the exception that calcium chloride was employed as the catalyst. The product so obtained was incorporated in a tread stock comprising:

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Mercapto-benzo-thiazole | 1 |
| The antioxidant described above | 1 |

After vulcanizing the cured rubber stock was aged in the Bierer-Davis oxygen bomb and the results obtained as given in Table VIII.

*Table VIII*

| Cure | | | Modulus of elasticity in lbs/in.$^2$ at elongations of— | | Tensile at break in lbs/in.$^2$ | Ult. elong., percent |
|---|---|---|---|---|---|---|
| Mins. | Lbs. steam pressure | Hrs. aged | 200% | 400% | | |
| 60 | 30 | 0 | 1500 | 3660 | 4005 | 430 |
| 60 | 30 | 96 | 1400 | | 1955 | 280 |
| 75 | 30 | 0 | 1550 | 3720 | 4100 | 450 |
| 75 | 30 | 96 | 1353 | | 1765 | 270 |

Among other examples prepared and on testing found to possess the desirable antioxidant and flexing properties typical of the class is the reaction product of diphenyl-p-phenylene diamine, formaldehyde and glycerine.

From the data hereinbefore set forth it is readily shown that the preferred class of compounds comprises an important class of rubber antioxidants which markedly resist the deterioration influences due to heat, oxidation and flexing.

In the preparation of the new and preferred class of chemical products, other methods may be employed which are clearly apparent to those skilled in the art to which the invention pertains in view of the present disclosure. Thus, other condensing and/or dehydrating agents, as for example anhydrous calcium chloride have been so employed.

Obviously, practice of the present invention is not limited to the specific compositions given above, such compositions being merely illustrative of the manner of employing the antioxidants or age-resistors of this invention. The antioxidants or age-resistors may be employed in conjunction with other vulcanizing agents than those specifically disclosed, for this invention is applicable generally to pure rubber or rubber compositions of the most varied nature. Furthermore, the preferred class of materials may be employed in rubber stocks in conjunction with other accelerators than the one specifically shown with varying differences in tensile and modulus properties but still exhibiting the desirable qualities of the class. Thus, for example the antioxidants of the present invention have been employed in a stock in which mercaptobenzothiazole was used as the accelerator, and the vulcanized rubber product found to possess the desirable aging, flexing and like properties typical of the new class of compounds.

It is to be understood that the term "treating" as employed in the appended claims is used in a generic sense to include either the incorporating of the preferred class of materials into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products whether or not admixed with fillers, pigments or accelerating agents.

This application is a continuation in part of my prior application Serial No. 728,753, filed June 2, 1934.

The present invention is limited solely by the claims attached hereto as part of the present specification.

What is claimed is:

1. The method of preserving rubber which comprises treating rubber with a product obtainable by reacting substantially one molecular proportion of a N, N' diaryl phenylene diamine with not more than substantially two molecular proportions each of an aliphatic aldehyde and an alcohol in the presence of a condensing agent.

2. The method of preserving rubber which comprises treating rubber with a reaction product obtainable by reacting substantially one molecular proportion of a N, N' diaryl phenylene diamine with not more than substantially two molecular proportions each of formaldehyde and an alcohol in the presence of a condensing agent.

3. The method of preserving rubber which comprises treating rubber with a reaction product obtainable by reacting substantially one molecular proportion of N, N' diphenyl-p-phenylene diamine with not more than substantially two molecular proportions each of formaldehyde and an alcohol in the presence of a condensing agent.

4. The method of preserving rubber which comprises treating rubber with a reaction product obtainable by reacting substantially one molecular proportion of a N, N' diaryl phenylene diamine with substantially two molecular proportions each of formaldehyde and an alcohol in the presence of a condensing agent.

5. The method of preserving rubber which comprises treating rubber with a reaction product obtainable by reacting substantially one molecular proportion of a N, N' diphenyl phenylene diamine with substantially two molecular proportions each of formaldehyde and an aliphatic alcohol in the presence of a condensing agent.

6. The method of preserving rubber which comprises treating rubber with a reaction product obtainable by reacting substantially one molecular proportion of N, N' diphenyl-p-phenylene diamine with not more than substantially two molecular proportions each of formaldehyde and butyl alcohol in the presence of a condensing agent.

7. The method of preserving rubber which comprises treating rubber with a reaction product obtainable by reacting substantially one molecular proportion of N, N' diphenyl-p-phenylene diamine with substantially two molecular proportions each of formaldehyde and n-butyl alcohol in the presence of a condensing agent.

8. The method of preserving rubber which comprises treating rubber with a reaction product obtainable by reacting substantially one molecular proportion of N, N' diphenyl-p-phenylene diamine with substantially two molecular proportions each of formaldehyde and amyl alcohol in the presence of a condensing agent.

9. The method of preserving rubber which comprises treating rubber with a reaction product obtainable by reacting substantially one molecular proportion of N, N' dipheyl-p-phenylene diamine with substantially one molecular proportion each of formaldehyde and lauryl alcohol in the presence of a condensing agent.

10. The vulcanized rubber product produced by heating rubber and sulfur in the presence of a product obtainable by reacting substantially one molecular proportion of a N, N' diaryl phenylene diamine with not more than substantially two molecular proportions each of an aliphatic aldehyde and an alcohol in the presence of a condensing agent.

11. The vulcanized rubber product produced by heating rubber and sulfur in the presence of a reaction product obtainable by reacting substantially one molecular proportion of a N, N' diaryl phenylene diamine with not more than substantially two molecular proportions each of formaldehyde and an alcohol in the presence of a condensing agent.

12. The vulcanized rubber product produced by heating rubber and sulfur in the presence of a reaction product obtainable by reacting substantially one molecular proportion of N, N' diphenyl-p-phenylene diamine with not more than substantially two molecular proportions each of formaldehyde and an alcohol in the presence of a condensing agent.

13. The vulcanized rubber product produced by heating rubber and sulfur in the presence of a reaction product obtainable by reacting substantially one molecular proportion of a N, N' diaryl phenylene diamine with substantially two molecular proportions each of formaldehyde and an alcohol in the presence of a condensing agent.

14. The vulcanized rubber product produced by heating rubber and sulfur in the presence of a reaction product obtainable by reacting substantially one molecular proportion of a N, N' diphenyl phenylene diamine with substantially two molecular proportions each of formaldehyde and an aliphatic alcohol in the presence of a condensing agent.

15. The vulcanized rubber product produced by heating rubber and sulfur in the presence of a reaction product obtainable by reacting substantially one molecular proportion of N, N' diphenyl-p-phenylene diamine with not more than substantially two molecular proportions each of formaldehyde and butyl alcohol in the presence of a condensing agent.

16. The vulcanized rubber product produced by heating rubber and sulfur in the presence of a reaction product obtainable by reacting substantially one molecular proportion of N, N' diphenyl-p-phenylene diamine with substantially two molecular proportions each of formaldehyde and n-butyl alcohol in the presence of a condensing agent.

17. The vulcanized rubber product produced by heating rubber and sulfur in the presence of a reaction product obtainable by reacting substantially one molecular proportion of N, N' diphenyl-p-phenylene diamine with substantially two molecular proportions each of formaldehyde and amyl alcohol in the presence of a condensing agent.

18. The vulcanized rubber product produced by heating rubber and sulfur in the presence of a reaction product obtainable by reacting substantially one molecular proportion of N, N' diphenyl-p-phenylene diamine with substantially one molecular proportion each of formaldehyde and lauryl alcohol in the presence of a condensing agent.

GEORGE D. MARTIN.